United States Patent [19]

Deiaco et al.

[11] 4,362,312
[45] Dec. 7, 1982

[54] REACH COMPENSATOR FOR LOGGING TRUCK AND TRAILER

[76] Inventors: Frank Deiaco; Allan J. McInnes, both of 2355 Marlborough Dr., Nanaimo, B.C., Canada, V9S 3J3

[21] Appl. No.: 903,835

[22] Filed: May 8, 1978

[51] Int. Cl.³ ................................................ B62D 53/00
[52] U.S. Cl. .................................... 280/404; 280/487
[58] Field of Search .................. 280/404, 477, 478 R, 280/482, 483, 486, 487; 403/166, 359, 102, 104, 105, 106, 107, 108, 109

[56] References Cited

U.S. PATENT DOCUMENTS

| | | | |
|---|---|---|---|
| 1,289,141 | 12/1918 | Ferris | 280/487 |
| 1,308,039 | 7/1919 | Cadman | 280/404 |
| 3,014,332 | 12/1961 | Hubbard | 403/356 |

*Primary Examiner*—John J. Love
*Assistant Examiner*—Randall A. Schrecengost
*Attorney, Agent, or Firm*—Howard I. Podell

[57] ABSTRACT

Improved coupling means for connecting a logging truck and a trailer to provide the relative longitudinal movement therebetween to negotiate turns wherein the reachpole of the trailer has a cylindrical sleeve at the forward end thereof and a spring loaded telescopic reach member rotatably mounted therein with its free end connected to the hitch of the truck. These coupling means reduce tight turning and danger of load binding on sharp curves, where most of the accidents happen due to trucks not being able to get around sharp corners. This compensator is easy to maintain, due to fewer moving parts. It remains attached to the trailer, reducing replacement costs of truck, with truck replacement needed twice as often as trailer's. It can also be removed from an old trailer and be re-assembled on a new unit.

3 Claims, 4 Drawing Figures

REACH COMPENSATOR FOR LOGGING TRUCK AND TRAILER

FIELD OF THE INVENTION

This invention relates generally to coupling means for connecting a trailer to a logging truck.

DESCRIPTION OF THE PRIOR ART

The prior art, as exemplified by U.S. Pat. Nos. 3,857,586; 3,847,228; 3,700,261; 3,273,911; and 3,171,673 is generally illustrative of various devices of this type. While such devices are generally acceptable for their intended purpose they have not proven to be entirely satisfactory in that they are either complex and expensive to manufacture, or bulky and inconvenient to use, or require unusual skill and/or dexterity to operate. As a result of the short comings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction so as to encourage widespread use thereof.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

SUMMARY OF THE INVENTION

This invention resides in an improved coupling means for connecting a logging truck and a trailer to provide the relative longitudinal movement therebetween to negotiate turns wherein the reachpole of the trailer has a cylindrical sleeve at the foward end thereof and a spring loaded telescopic reach member rotatably mounted therein with its free end connected to the hitch of the truck. These couplings means reduce tight turning and danger of load binding on sharp curves, where most of the accidents happen due to trucks not being able to get around sharp corners. This compensator is easy to maintain, due to fewer moving parts. It remains attached to the trailer, reducing replacement costs of truck, with truck replacement needed twice as often as trailer's. It can also be removed from an old trailer and be re-assembled on a new unit.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 3:
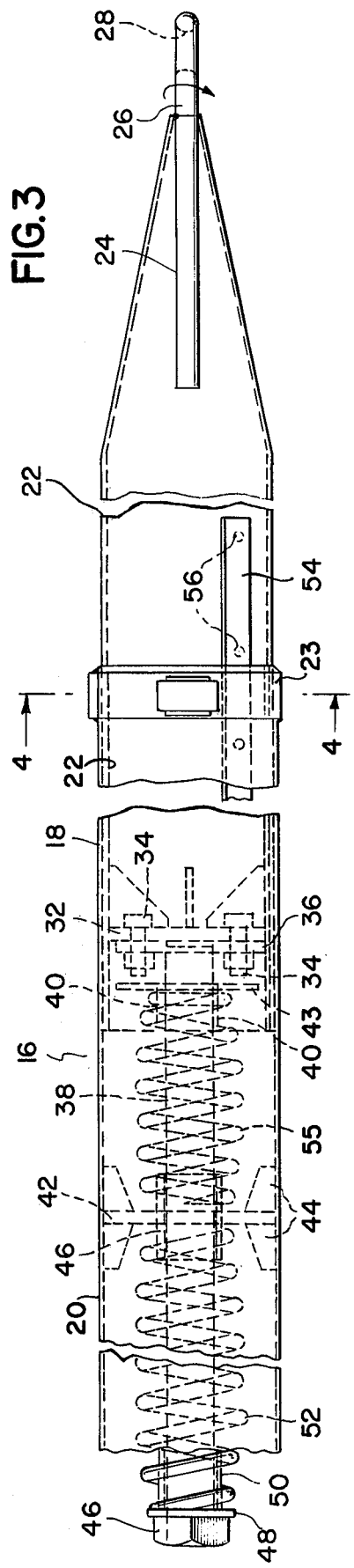
FIG. 3 is a partly sectional view of the coupling means.

With reference to the drawing, there is shown and illustrated a coupling means for connecting a trailer to a logging truck constructed in accordance with the principles of the invention and designated generally by reference character 10. The illustrated tangible embodiment of the invention includes a trailer 12 adapted to be towed by a towing vehicle 14. Trailer 12 has a reach-pole 16 at its front end 18 which is open to form an elongated cylindrical sleeve referred to hereinafter as outer sleeve 20 (FIG. 3). Suitably, sleeve 20 consists of a steel tube measuring $12\frac{3}{4}$ O.D.$\times \frac{3}{8} \times 72$ inches in length. Sleeve 20 is fixed to an external collar 23 at its forward end. Axially movable and rotatably received in outer sleeve 20 is an inner sleeve 22 suitably consisting of a steel tube measuring 11 inches O.D.$\times \frac{3}{8} \times 72$ inches, and having a tapered front end with a slit 24 therein for receiving a forging plate 26 with eye 28 for securing to a hitch 30 on trailer 14 in known manner. Plate 26 suitably is 25 inches long and eye 28 has an inner diameter of $2\frac{5}{8}$ inches.

A metal disc 32 is welded to the inside of inner sleeve 22 and has bolted thereto by bolts 34 a second disc 36 to which is welded the inner end of high tensile strength rod 38 consisting of a three inch diameter $64\frac{1}{2}$ inch long metal bar. An inner sleeve 40 with peripheral flange 43 fits around the forward end of rod 38.

A disc 42 flanked by gussets 44 is welded in outer sleeve 18 and is traversed by tube 46 which is about six inches long and fits on rod 38. The rear end of rod 38 is threaded and has thereon three inch nut 46 holding disc 48 against the outer end of tube 50 fitted over rod 38 and on which is wound the end of barrel spring 52 whose other end is wound on the inner rear end of tube 46.

Spring 52 can consist of a 36 inch length of $\frac{7}{8}$ inch diameter wire 7 inch O.D.$\times$4 inch I.D. or two 18 inch lengths of same.

A similar spring 55 fits on the forward end of tube 46 and the end of sleeve 40.

Discs 42 and 32 act as internal spring-stops so that inner sleeve 22 is spring loaded against axial movement in the outer sleeve 20. The feature of spring loading the reach or inner sleeve 22 of the trailer allows for take-up of the weight force of trailer pushing vehicle when stopping, acting as a cushion. Conversely this spring allows travel at start-up taking the load of the trailer. Sleeve 22 will turn 100 degrees to allow the truck to roll on its side, and leave the trailer sitting upright, without breaking the reach by the turning or rolling over force.

Figure 1:
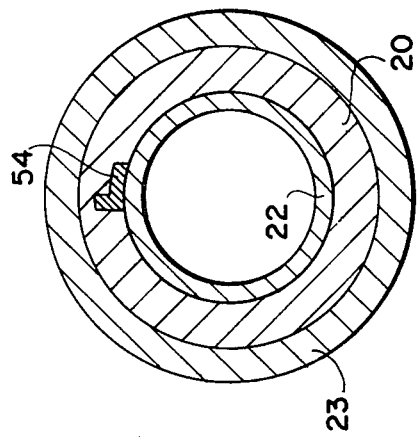
FIG. 1 is a side elevation of a logging truck and trailer coupled with the reach capacitor of the invention.
Figure 2:
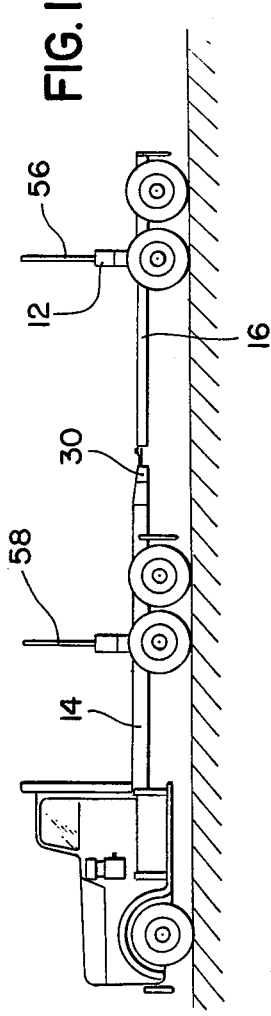
FIG. 2 is an underneath view of same.

The arrows in FIG. 2 indicate the oscillatory movement possible with the assembly during turns.

Figure 4:
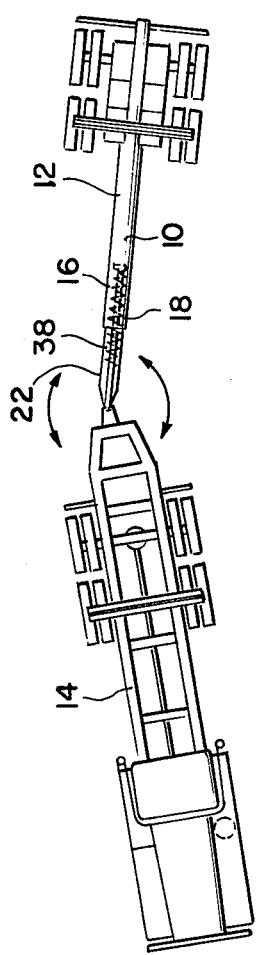
FIG. 4 is a sectional view taken along line 4-4 of FIG. 3 and showing guide means for preventing rotation, but not axial movement of the coupling means.

FIG. 4 shows the cross-section of an arrangement including a bar guide 54 bolted by bolts 56 to the inner sleeve 22 to prevent same from turning when the trailer is in piggy-back position to be re-loaded with logs at a siding. This guide 54 does not prevent axial displacement of inner sleeve 22 but only its rotation. The guide 54 can be bolted on or off as required.

The described assembly gives logging trailers when loading and when loaded better maneuverability than those presently provided on existing truck trailer units. Existing compensators are generally a part of the truck, mounted at the hitch these provide movement between truck and trailer, while loading and when both units are moving, but not enough to do the complete job, as on sharp curves there remains a problem of truck turning enough to negotiate the turn.

The assembly allows the reach 22 to move forward and backward even when hooked-up to the hitch assembly on the truck. When logs are loaded onto the logging trailer bunks 56 located at the rear of the trailer, with the front bunks 58 located on the truck, when fully loaded with logs there is no movement allowed at the reach assembly on the normal existing hitch, and the logs become the reach, in fact, preventing any movement from trailer to truck under load. With this same system, if a truck were loaded on uneven roadway (which is more often than not, the case at loading points in the bush) when the truck moves to level position after a load is placed, great strain and pressure is placed at the trailer bunks on the hitch and truck bunks, as they all try to adjust to the log pressure above as the movement from an uneven position to level position takes place. Many problems are caused by this pressure, as the truck proceeds to the log dump, it can experience hard steering on curves finding it almost impossible to take sharp curves. In many cases a truck has gone off the road due to poor steering under load.

The present coupling means accomplishes the following: (a) It allows the truck and trailer when fully loaded to come to a level position when moved from an unlevel loading, (b) further allows the reach to travel from a center position to meet the outside turn up to 36 inches and return to center as the truck straightens out, taking the pressure off both truck and trailer. (c) Should the trailer run into a soft shoulder and roll over the compensator assembly can travel completely 100% preventing the hitch from being twisted off the truck, or rolling the truck with the trailer as is often the case with existing hook-ups because they only allow a 30% roll movement before pressure at the truck caused further problems. (d) This compensator provides a soft movement when braking the vehicle with trailer in tow the truck does not receive the weight immediately but the spring holds back the force giving gradual release as the pressure increases. On sudden stops, it is known that on bad road conditions the trailer forces the skid, and jack knifes the whole rig but the present compensator reduces this happening. The compensator further assists on start-up allowing motion to take place and gradually take the load on the trailer behind.

On smaller trailer units where level hitch assemblies are used this reach can be secured by the use of a yoke spring with pin, this allows the level lift to operate as the reach moves in or out at stop start and turning positions, without losing the trailer and vehicle towing level.

The invention can be adapted to recreation trailers to provide better stopping conditions at all times. On all types of road conditions. This is due to the spring assembly which allows the load being towed to soft cushion at the hitch when brakes are applied. It also allows load to move against the spring cushion on start-up, allowing smoother load under way conditions. In the stopping position it reduces the effect of jack knifing the trailer in fast stops, with this cushion allowance spring assembly. It can also be an application on railway car hook-ups, providing similar conditions as above.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. In a trailer adapted to be towed by a towing vehicle where said trailer and said towing vehicle are each fitted with means to secure to a common semi-rigid load member that may be fastened to both the trailer and the towing vehicle, a reachpole including a tubular member having a forward end, an elongated cylindrical inner sleeve telescopically received within and movable longitudinally of said tubular end; spring means urging said sleeve into said reachpole; said inner sleeve having a front end extending out of said tubular member and having means on said front end for releasably attaching same to said towing vehicle, in which the said inner sleeve is normally free to rotate with respect to the tubular member, further including a longitudinal bar guide removably secured to the outer surface of said inner sleeve, by fastener means, to prevent rotation thereof in said tubular member, when the trailer and towing vehicle are being loaded.

2. The invention as recited in claim 1, further including first disc fixed to the inner end of said inner sleeve and a second disc secured to said tubular member, a rod secured at one end thereof to said first disc and having a stop at its other end; said spring means consisting of barrel springs wound around said rod and extending between said stop and said second disc and between said second disc and said first disc; said discs also serving as spring stops.

3. The invention as recited in claim 1 in which the fastener means comprises a threaded fastener.

* * * * *